US008583467B1

(12) United States Patent
Morris et al.

(10) Patent No.: US 8,583,467 B1
(45) Date of Patent: Nov. 12, 2013

(54) METHOD AND SYSTEM FOR OPTIMIZED SCHEDULING OF WORKFLOWS

(75) Inventors: Sean Morris, Renmore (IE); Peter Keane, Co. Galway (IE); Igor Nikolaev, Galway (IE); Tom Mulligan, Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/592,869

(22) Filed: Aug. 23, 2012

(51) Int. Cl.
*G06Q 10/00* (2012.01)
(52) U.S. Cl.
USPC .......................... 705/7.26; 705/7.22; 705/7.27
(58) Field of Classification Search
USPC ............................... 705/7.12, 7.22, 7.26, 7.27
See application file for complete search history.

(56) References Cited

U.S. PATENT DOCUMENTS

| | | | |
|---|---|---|---|
| 6,321,133 B1 * | 11/2001 | Smirnov et al. ............... | 700/100 |
| 7,603,285 B2 | 10/2009 | Jacobs et al. | |
| 2007/0055558 A1 * | 3/2007 | Shanahan et al. ................. | 705/7 |
| 2008/0177687 A1 * | 7/2008 | Friedlander et al. ............ | 706/46 |
| 2008/0183538 A1 * | 7/2008 | Hamadi et al. .................... | 705/8 |
| 2009/0055237 A1 * | 2/2009 | Henry et al. ....................... | 705/8 |
| 2009/0204461 A1 | 8/2009 | Jain et al. | |
| 2011/0077994 A1 | 3/2011 | Segev et al. | |
| 2011/0125539 A1 * | 5/2011 | Bollapragada et al. ...... | 705/7.12 |
| 2012/0159499 A1 * | 6/2012 | Shafiee et al. ................ | 718/103 |

OTHER PUBLICATIONS

Senkul, et al., "A Logical Framework for Scheduling Workflows Under Resource Allocation Constraints," Proceedings of the 28th VLDB Conference, Hong Kong, China 2002, 12 pages.
Senkul, et al., "An Architecture for Workflow Scheduling Under Resource Allocation Constraints," Information Systems 30 (2005), 24 pages.

* cited by examiner

*Primary Examiner* — Andre Boyce
*Assistant Examiner* — William Brockington, III
(74) *Attorney, Agent, or Firm* — Proskauer Rose LLP

(57) ABSTRACT

A computer-implemented method is provided for optimizing scheduling and resource allocation for a workflow. The method includes receiving i) resource information representing resources available for allocation to the workflow and ii) one or more workflow constraints. The method determines one or more probable sequences for executing the workflow. Each probable sequence includes tasks usable to execute at least a portion of the workflow. Each task is assigned a probability of task execution. The method assigns a probability of sequence execution to each of the probable sequences based on the probability of task execution of the tasks forming the probable sequence. The method further determines an optimized scenario for scheduling the workflow based on the probable sequences. The optimized scenario can have an optimized probability of completion.

17 Claims, 6 Drawing Sheets

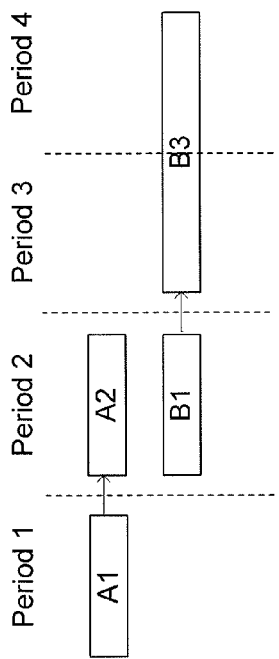

METHOD AND SYSTEM FOR OPTIMIZED SCHEDULING OF WORKFLOWS

FIELD OF THE INVENTION

The invention relates generally to computer-implemented methods and apparatuses, including computer program products, for optimizing scheduling and resource allocation for one or more workflows, and more particularly, to generating at least one workflow execution scenario that optimizes a probability of workflow completion and satisfies one or more constraints.

BACKGROUND OF THE INVENTION

Workflow management involves, in part, planning, organizing, securing and managing resources to bring about the successful completion of workflows with respect to specific goals and objectives. A workflow generally includes a sequence of interdependent tasks, where each task is executed following the previous task without delay and ends just before the subsequent task begins. Goals and objectives achievable by a workflow can be provided in a service-level agreement (SLA), which can define, for example, a contracted delivery time of service.

In today's workflow planning, there is a lack of efficient mechanism to model and manage resource demands by workflows. In addition, there is a lack of efficient mechanism to optimize scheduling of workflows to achieve certain business targets. Due to an ever-increasing number of operations-related concerns in today's work environment, there is a great deal of interest in improving these mechanisms. For example, in operations workforce planning, a manger may be concerned with having the appropriate resources available for allocation to the right work groups to deliver certain business-level goals associated with a forecasted volume of work. As another example, in business operations planning, a manager may be concerned with developing an efficient resource allocation plan that allows the business to achieve targeted goals defined by one or more SLAs, even during peak seasonal workloads.

SUMMARY OF THE INVENTION

Methods and apparatus are provided to optimize scheduling and resource allocation for one or more workflows. The methods and apparatus address deficiencies in today's workflow planning processes by ensuring that resource allocation to and scheduling of one or more workflows are optimized to satisfy certain constraints and business metrics. Constraint programming and/or linear programming, in conjunction with stochastic modeling, can be used to implement the optimization schemes of the present invention.

The present invention provides for automated assignment of resources to workflows based on dynamic observation of workflow efficiency and throughput taking into account of other considerations, including, for example, relative criticality of each workflow and availability of resources to accommodate the tasks of each workflow. In addition, the present invention allows for the interleaving of tasks corresponding to multiple workflows, thus enhancing workflow execution efficiency. Furthermore, the present invention provides "what if" analysis capability to allow a user to explore different scheduling scenarios that satisfy workflow constraints and business objectives.

In one aspect, there is a computer-implemented method for optimizing scheduling and resource allocation for a workflow. The method includes receiving, at a computing device, i) resource information representing resources available for allocation to the workflow and ii) one or more workflow constraints. The method includes determining, by the computing device, one or more probable sequences for executing the workflow. Each probable sequence includes tasks usable to execute at least a portion of the workflow. Each task is assigned a probability of task execution. The method also includes assigning, by the computing device, a probability of sequence execution to each of the probable sequences based on the probability of task execution of the tasks forming the probable sequence. The method further includes determining, by the computing device, an optimized scenario for scheduling the workflow based on the probable sequences. Scheduling the workflow according to the optimized scenario generates an optimized probability of completion and satisfies the workflow constraints without exceeding the resources available for allocation.

In some embodiments, the computer-implemented method further includes monitoring, by the computing device, execution of a first task in the workflow, and adjusting, by the computing device, the probability of sequence execution corresponding to each of the probable sequences in response to the execution of the first task. The method also includes determining, by the computing device, a second optimized scenario for scheduling the remaining workflow based on the adjusted probable sequences. Scheduling the remaining workflow according to the second optimized scenario generates a second optimized probability of completion and satisfies the workflow constraints without exceeding remaining resources available for allocation.

In some embodiments, the method further includes updating the probability of task execution of the first task based on the execution of the first task. In some embodiments, the remaining resources available for allocation can include resources remaining after satisfying an actual resource demand of the first task. The method can further include updating the estimated resource constraint of the first task based on the actual resource demand of the first task. In some embodiments, the first task is usable as a potential task for executing at least a portion of a second workflow.

In some embodiments, the method further includes receiving, by the computing device, a user input to change at least one of the resource information or the workflow constraints and determining, by the computing device, another optimized scenario based on the probable sequences to satisfy the user input.

In some embodiments, the method further includes optimizing scheduling and resource allocation for the workflow and a second workflow. In such a case, the resources are available for allocation to both the workflow and the second workflow.

In some embodiments, a level of confidence of the workflow can be determined to satisfy at least one business goal based on the optimized probability of completion. A resource demand of the workflow can also be estimated based on the scenario.

In another aspect, a computer-implemented method is provided for optimizing scheduling and resource allocation for at least a first workflow and a second workflow. The method includes receiving, at a computing device, i) resource information representing resources available for allocation to the first and second workflows and ii) one or more workflow constraints for the first and second workflows. The method includes determining, by the computing device, one or more probable sequences for executing the first and second workflows. Each probable sequence includes tasks usable to execute at least a portion of the first workflow, the second workflow, or both. Each task is assigned a probability of task execution. The method also includes assigning, by the computing device, a probability of sequence execution to each of the probable sequences based on the probability of task execution of the tasks forming each probable sequence. The method further includes determining, by the computing device, an optimized scenario for scheduling the first and second workflows based on the probable sequences. Scheduling the workflows according to the optimized scenario generates an optimized probability of completion and satisfies the workflow constraints for the first and second workflows without exceeding the resources available for allocation.

In some embodiments, the optimized scenario schedules the first and second workflows such that they overlap for at least a portion of their durations.

In yet another aspect, a system is provided for optimizing scheduling and resource allocation for at least one workflow. The system includes one or more inputs for: i) resource information representing resources available for allocation to the workflow and ii) one or more workflow constraints. The system includes a process management module for determining one or more probable sequences for executing the workflow. Each probable sequence includes tasks usable to execute at least a portion of the workflow. Each task is assigned a probability of task execution. The system also includes a stochastic module for determining a probability of sequence execution for each of the probable sequences based on the probability of task execution of the tasks forming each probable sequence. The system further includes an optimization module for determining an optimized scenario for scheduling the workflow based on the probable sequences. Scheduling the workflow according to the optimized scenario generates an optimized probability of completion and satisfies the workflow constraints without exceeding the resources available for allocation.

In some embodiments, the system further includes a task database for storing the tasks usable to execute at least a portion of the workflow. The system can further include an output interface for providing the optimized scenario and the optimized probability of completion to a user.

In some embodiments, the one or more inputs include a command from a user to change at least one of the resource information or the workflow constraints.

In other examples, any of the aspects above can include one or more of the following features. In some embodiments, the estimated resource constraint of a task defines an estimated demand for resource by the task over a probable duration of the task. In some embodiments, the probability of task execution of a task defines the probability the task is executed after a previous inter-dependent task is executed in the workflow. In some embodiments, the workflow constraints include at least one of a starting date and an ending date, a duration limit, or a probability of completion threshold. In some embodiments, linear programming is used to implement an optimization formulation for generating the optimized scenario.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIGS. 3A-C show an exemplary approach for determining probable sequences and scheduling scenarios for two workflows.

DESCRIPTION OF THE INVENTION

Figure 1:
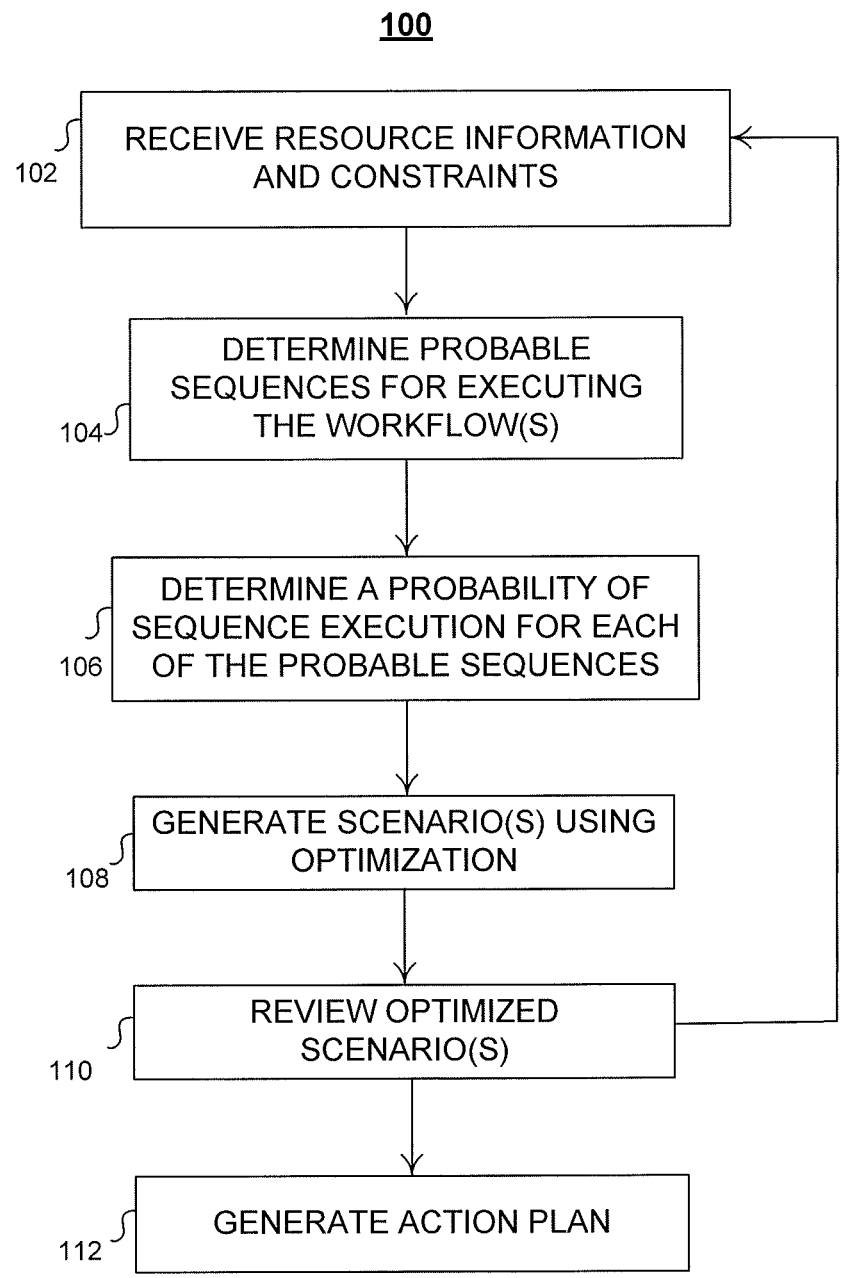
FIG. 1 shows an exemplary flowchart depicting a general process for scheduling one or more workflows.

FIG. 1 shows an exemplary flowchart 100 depicting a general process for scheduling one or more workflows. The elements of the flowchart 100 are described using the exemplary management system 250 of FIG. 6. The process can include receiving resource information and constraints for workflow(s) (step 102), determining one or more probable sequences for executing the workflow(s) (step 104), determining a probability of sequence execution for each of the probable sequences (step 106), generating at least one scenario for scheduling the workflow(s) using optimization techniques (step 108), allowing a user to review the scenario (step 110), and generating an action plan (step 112).

Resource information that is provided to and received by (step 102) the management system 250 can include information that represents resources available for allocation to one or more workflows. Constraints that are provided to and received by (step 102) the management system 250 can represent constraints corresponding to one or more workflows for which allocation of the identified resources are required. Resource allocation can involve suitable scheduling of the workflows such that the constraints are satisfied without exceeding resource availability. In general, the resource information and workflow constraints can be provided and/or received as a data structure such as, for example, textual lists, XML documents, class objects (e.g., instances of C++ or Java classes), other data structures, or any combination thereof.

Resource information can represent multiple resources, which can range from human personnel (e.g., computer programmers, accountants, employees, consultants, etc.) to physical resources (e.g., a computer resources, infrastructure resources such as a geographic locations or buildings/office space, any type of supply or manufacturing material, physical equipment items, etc.). Human resource information can include attribute information defining one or more of any of the following: type attributes (e.g., full-time employee, part-time employee, contractor, temp, etc.), role attributes (e.g., workflow manager, architect, analyst, QA engineer, database manager/administrator, computer programmer), role-level attributes (e.g., a principal role, a senior role, an entry-level role, a graduate role, etc.), skill attributes (e.g., Java, C++, or generally any knowledge/ability to undertake a required activity), geographic attributes (e.g., one or more cities/countries or other locations where person is available to work), education attributes (e.g., Ph.D., M.B.A., J.D., etc.), language attributes (e.g., French, German, etc.), cost attributes (e.g., $/hour), experience attributes (e.g., years of experience working on regulatory compliance), fungibility, human fragmentation attributes (e.g., the capability to be assigned to multiple tasks), security attributes (e.g., security clearance, etc.), criticality attributes (e.g., a measure of the importance of a human resource), and/or any combination thereof.

Physical resource information can include attribute information defining one or more of any of the following: geographic attributes (e.g., one or more locations where physical resource can be used or accessed), cost attributes (e.g., cost to use per hour, cost of supply per unit, etc.), availability attributes (e.g., information indicating times/dates and/or locations that the resource is available for use and not yet assigned), supply attributes (e.g., amount of supply), throughput attributes (e.g., network bandwidth, system capacity, physical space, etc.), security attributes, and/or any combination thereof. In some embodiments, the resources represented by the resource information can include both human personnel and physical resources in any combination thereof.

In some embodiments, resource information specifies the amount of resources available for allocation over a specified period of time. For example, resource information can provide that over a six-period time span, only two units of resources are available for allocation per period. Multiple workflows can compete for the same resources within the given time span.

A workflow can be defined by one or more workflow constraints. Workflow constraints can include at least a starting date and an end date during which the workflow is expected to be completed. Completion of a workflow also requires certain amount of resources. In general, workflow constraints include, for example, one or more resource constraints, schedule constraints, cost constraints, risk constraints, criticality constraints, technology constraints, business metrics constraints, or any combination thereof. In some embodiments, a service-level agreement (SLA) corresponding to a workflow is submitted to the management system 250. The SLA sets goals and objective to be achieved by the workflow and can include any one of the constraints defined for the workflow. If multiple workflows are provided (step 102), at least one global constraint can be defined that pertains to all the workflows. For example, a workflow constraint can specify a starting date and an end date during which all workflows are expected to be completed.

Resource constraints of a workflow define what resources are required or can be used for the successful completion of the workflow. Exemplary resource constraints include human or machine utilization level, team utilization level, resource fragmentation level, and location fragmentation data. In some embodiments, a resource constraint can define a minimum or maximum number of resources required. Resource constraints can also specify a minimum level of experience, certification, and/or security clearance. Aside from resource constraints that specify a general constraint, resource constraints can also specify a specific resource (e.g., the name of a particular person or physical resource). In general, resource constraints can be tied to or associated with any resource attribute described above. In some embodiments, resource constraints of a workflow are estimated based on probable resource demands of individual tasks making up the workflow. Details regarding estimation of a probable resource demand of a task in a workflow are described below.

Schedule constraints for a workflow can include a start-date, an end-date, one or more milestone dates, a duration limit, or any combination thereof. Exemplary schedule constraints include earliest start date, latest finish date, or an estimate of how many days a workflow may take. In some embodiments, a schedule constraint can be defined as a hard constraint or an unchangeable constraint (e.g., for high priority workflow, for a workflow in-flight, or for workflows in which the investment therein has surpassed a threshold amount). In some embodiments, a date constraint can be made dependent on the completion of any date or event associated with another workflow. In some embodiments, schedule constraints of a workflow are estimated based on probable durations of individual tasks making up the workflow. Details regarding estimation of a probable duration of a task in a workflow are described below.

A cost constraint for a workflow can set a minimum or maximum limit on the amount of money (e.g., spent on resources) estimated to be spent on the workflow. A return-on-investment (ROI) constraint can set a minimum limit on the profitability or ROI of a workflow.

Criticality constraints (e.g., a priority level) for workflows can be used by the management system 250 as a guide to order execution of workflows for determining which workflows get allocated resources/scheduled first. A criticality constraint can also be used to determine whether a workflow can be deferred to a later late or not implemented altogether if insufficient resources are available for its successful completion.

Business metrics constraints for a workflow can include a probability threshold for achieving a target. As an example, a probability-of-completion threshold defines a confidence threshold for completing the workflow within a specific time limit.

After receiving resource information and constraints for one or more workflows, the management system 250 determines one or more possible sequences of tasks for executing the workflow(s) (step 104) and a probability of sequence execution for each of the possible sequences (step 106). In general, execution of a workflow can be divided into a series of interdependent steps, herein referred to as tasks. In some embodiments, a probable duration is defined for each task. The probable duration provides an estimated duration the task may take to complete. A probable resource demand can also be defined for each task. The probable resource demand provides an estimated type and/or amount of resource(s) the task may require. For a workflow, its probable sequences, along with the probable durations and probable resource demands of tasks making up each probable sequence, can be used to estimate the overall resource demand and duration of the workflow.

Figure 2:
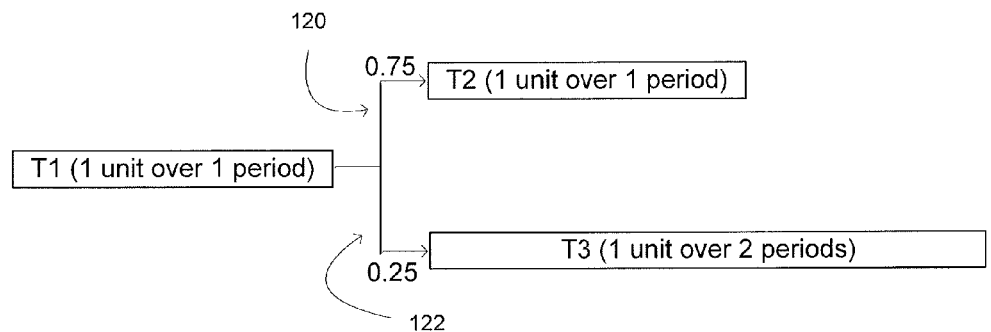
FIG. 2 shows probable sequences for executing a single workflow.

In many cases, there is more than one possible sequence of tasks for completing a workflow. For example, as shown in FIG. 2, a workflow can be executed via two probable sequences 120 and 122, each sequence including at least one task. Specifically, sequence 120 includes tasks T1 and T2, while sequence 122 includes tasks T1 and T3. A probability of execution can be assigned to each task. In the example of FIG. 2, task T1 is executed 100% of the time when completing the workflow. Therefore, task T1 is assigned a probability of execution of 100%. However, task T2 is executed less than 100% of the time, such as 75% of the time while task T3 is executed 25% of the time.

Therefore, the probability of execution of task T2 if task T1 is chosen is 75% and the probability of execution of task T3 if T1 is chosen is 25%. Moreover, for sequence 120, the probability of sequence execution is 75% (100% for T1*75% for T2). Similarly, for sequence 122, the probability of sequence execution is 25% (100% for T1*25% for T3). In some embodiments, tasks T1, T2 and T3 have varying estimated duration and/or estimated resource demands. For example, tasks T1 and T2 each can have an estimated resource demand of 1 unit over a one-period duration and task T3 can have an estimated resource demand of 1 unit over a duration of two periods.

Figure 3A:
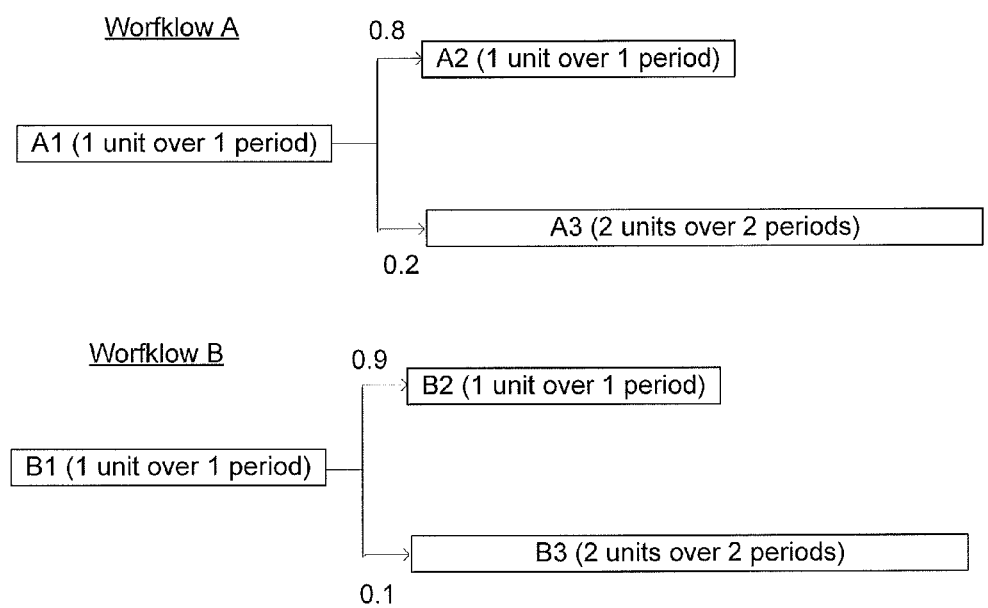

FIGS. 3A and 3B show an exemplary approach for determining probable sequences for two workflows (workflow A and workflow B) that compete for at least one common resource. FIG. 3A shows the probable sequences for executing each of the two workflows. As shown, there is an 80% probability of executing workflow A as a sequence of A1 and A2 and a 20% probability of executing workflow A as a sequence of A1 and A3. For workflow B, there is a 90% probability of executing the workflow as a sequence of B1 and B2 and a 10% probability of executing workflow B as a sequence of B1 and B3. In addition, tasks A3 and B3 each can have an estimated resource demand of 2 units over a two-period window. The other tasks each can have an estimated resource demand of 1 unit over a one-period window.

In some embodiments, the probable sequences for executing both workflows A and B are determined by determining different combinatorial arrangements for the probable sequences associated with each of the workflows. It can be assumed that, once a workflow starts, tasks in a given sequence of the workflow are completed in a consecutive fashion with no gaps between any two tasks. FIG. 3B shows an exemplary probable sequence for executing workflows A and B. At period 1, workflow A starts by implementing task A1. At period 2, task A2 is implemented and workflow B starts by executing task B1. At period 3, workflow A is finished and workflow B continues execution with task B3. Because task B3 takes two periods of time to complete, workflow B does not finish until period 4. The probability of execution associated with this particular sequence is 8%, which is the product of the probability of execution associated with the sequence A1-A2 (80%) and the probability of execution associated with the sequence B1-B3 (10%). FIG. 3B is merely illustrative of one possible sequence for scheduling the execution of workflows A and B. There are many other possible sequences for executing both of the workflows that can be derived based on the probable sequences associated with executing each workflow, as shown in FIG. 3A. The techniques illustrated in FIGS. 3A and 3B can also be applied to determine probable sequences for executing more than two workflows.

In some embodiments, tasks making up various sequences of different workflows are stored in a database accessible by the management system 250. For each task, the database can also store a probability of task execution, a probable duration and/or probable resource demand corresponding to that task. When the management system 250 receives a workflow, the management system 250 determines the probable sequences for executing the workflow by retrieving from the database the pertinent tasks associated with the workflow. If multiple workflows are specified, the management system 250 can determine the probable sequences for executing the multiple workflows by first determining the probable sequences for executing each of the workflows using, for example, the approach illustrated in FIGS. 3A and B.

The management system 250 proceeds to determine, based on the pool of probable sequences (from step 104), one or more scenarios (step 108) to schedule the workflow(s). Generally, a scenario can specify an appropriate time period to start each workflow by satisfying: i) the workflow constraints, ii) available resources, and iii) certain probability thresholds, such as a confidence threshold for completing the workflows within a given time frame. In some embodiments, the probability thresholds are defined and supplied to the management system 250 as a part of the workflow constraints.

These scenarios can be determined by using a multi-level optimization formulation. At each level, an objective function is optimized (i.e., maximized or minimized) while satisfying one or more constraints corresponding to that optimization level. Therefore, by appropriately defining the objective function and constraints for each optimization level, optimized solutions can be found to realize the objectives governing the allocation of resources and/or scheduling of workflows. In many applications, a multi-level optimization formulation is advantageous over a one-level optimization formulation. For example, constraints defined for a higher optimization level either cannot be expressed as constraints defined for a lower optimization level or require complex and convoluted mathematical mapping to be translated into lower-level constraints. Therefore, by using multi-level optimization objectives for allocating resources and performing workflow scheduling, the management system 250 can produce a faster and more accurate solution to satisfy the multi-level objectives. In addition, by applying optimization on different levels of a solution space, a set of richer and more complex constraints can be used.

Constraints associated with a first-level optimization formulation can include timing- and resource-related constraints. For example, if a workflow has a set of hard start and end dates and a probability-of-completion threshold, the management system 250 needs to schedule the workflow such that the probability of the workflow starting and ending within the time limitation specified satisfies the probability-of-completion threshold. In addition, the management system 250 needs to schedule the workflow such that it does not exceed resource availability. The management system 250 can perform such scheduling by applying optimization on the probable sequences generated (from step 104) and incorporating the probabilities of sequence execution (from step 106) in the optimization formulation.

As an example, an optimization scheme can be used to optimally schedule the exemplary workflow of FIG. 2. It is assume that 1 unit of resource is available for allocation to the workflow every time period for six consecutive time periods. Constraints associated with the workflow include: 1) the workflow needs to be completed in 3 time periods and ii) the probability of completion needs to be greater than or equal to 95%. Given that there is a 6-period window during which resource is available, if the workflow is scheduled to start in the first period (Scenario 1), then either the first or second probable sequence can be executed to complete the workflow in 3 periods while using less than or equal to 1 unit of resource per period. Hence, the probability of completion for starting at the first period is 100%. if the workflow is scheduled to start in the second period (Scenario 2), there is a 75% probability that the workflow finishes in 3 periods and a 25% probability that it does not (i.e., the probable sequence T1-T3 is completed in the fourth period if it starts in the second period). In other scenarios, if the workflow is scheduled to start in the third period or later, the probability of completion is 0% because neither of the probable sequences can be completed within the first 3 periods. Moreover, if the workflow is scheduled to start in the fifth period, the probability of not having enough resources is 25% (i.e., the probable sequence T1-T3 will not be completed in the 6-period window during which a resource is available). If the workflow is scheduled to start in the sixth period, the probability of not have enough resource is 100%. Therefore, Scenario 1 (i.e., starting the workflow in the first period) is the only option that satisfies the workflow constraints and does not exceed available resources.

As another example, an optimization scheme can be used to optimally schedule the two exemplary workflows of FIG. 3A. It is assumed that 2 units of resources are available for allocation to the workflows every time period for six consecutive time periods. Constraints associated with the workflows include: 1) both workflows need to be completed in 4 periods and ii) the probability of completion needs to be greater than or equal to 90%. FIG. 3C shows various scenarios for scheduling the two workflows. For example, Scenario 1 shows all possible sequences when starting workflow A in period 1 and starting workflow B in period 3. Scenario 2 shows all possible sequences when starting workflow A in period 1 and starting workflow B in period 2. Scenario 3 shows all possible sequences when starting workflow B in period 1 and starting workflow A in period 4. Scenario 4 shows all possible sequences when starting workflow B in period 1 and starting workflow A in period 3. Scenario 5 shows all possible sequences when starting both workflows A and B in period 1. Scenario 6 shows all possible sequences when starting workflow B in period 1 and starting workflow A in period 2. Scenario 7 shows all possible sequences when starting workflow A in period 1 and starting workflow B in period 4.

Using Scenario 1 as an example, only two probable sequences can satisfy the constraints of the workflow: the sequence A1-A2-B1-B2, with a probability of execution of 72% (80%*90%) and the sequence A1-A3-(A3 & B1)-B2 with a probability of execution 18% (20%*90%). Therefore, the probability of completing the two workflows within 4 periods in Scenario 1 is 90% (72%+18%). After making similar computations for all 7 different scenarios, the only scenario with a probability of completion greater than or equal to 90% is Scenario 1, which requires starting workflow A in period 1 and workflow B in period 3. Scenario 1 also satisfies other constraints of the workflow, such as requiring no more than 2 units of resources per period.

Constraints associated with a second-level optimization can include selecting, from the scenarios generated by the first-level optimization, those scenarios that satisfy one or more higher-level constraints. One exemplary higher-level constraint includes a utilization constraint, which selects one or more scenarios that maximize resource utilization. Another exemplary constraint includes a schedule constraint, which selects one or more scenarios having the least amount of completion time without overshooting available resources. Another exemplary constraint includes a risk level constraint, which selects one or more scenarios with the least amount of cumulative risk. Yet another exemplary constraint includes a return-on-investment (ROI) constraint, which selects one or more scenarios with the most expected gain minus cost.

In addition, higher-level constraints can be defined to determine the maximum number of workflows that are feasible to implement in a scenario based on existing supply of resources available to meet the demand associated with each workflow. In some embodiments, resources available for allocation may not be sufficient to satisfy all workflow resource demands. In such a situation, the management system 250 can defer some workflows by not including them in a preferred or planned scenario. Deferral can be based on the criticality and/or priority of the workflows (e.g., workflows that are least critical are most likely to be deferred or cancelled).

In some embodiments, the management system 250 does not generate a scenario if no such scenario exists to satisfy all the workflow constraints. For example, no scenario is generated if the probability-of-completion threshold cannot be met.

In some embodiments, multiple constraints can be used for each level of optimization. Each constraint can be scaled by a weight assigned to the constraint. For example, optimization can be performed to maximize resource utilization and minimize completion time. In addition, because different sets of scenarios can be generated depending on the order in which constraints are applied, a user can specify a specific order for applying the constraints.

In general, an optimization formulation can be solved using constraint programming and/or constraint logic programming. Constraint programming searches for a state of a system (e.g., a workflow scenario) in which a large number of constraints are satisfied at the same time. Constraint programming typically states the problem as a state of the system containing a number of unknown variables. The constraint program can then search for values for all of the variables. In some embodiments, constraint programming can include temporal concurrent constraint programming (TCC), non-deterministic temporal concurrent constraint programming (NTCC), or both TCC and NTCC. Some exemplary examples of constraint logic languages are: B-Prolog, CHIP V5, Ciao Prolog, ECLiPSe, SICStus Prolog, GNU Prolog, Oz programming language, YAP Prolog, SWI Prolog, Claire programming language, Curry programming language, and Turtle programming language. The constraints used in constraint programming can be one or more specified domains (e.g., Boolean domains, integer domains, rational domains, linear domains, finite domains, or any mixed combination thereof).

Figure 4:
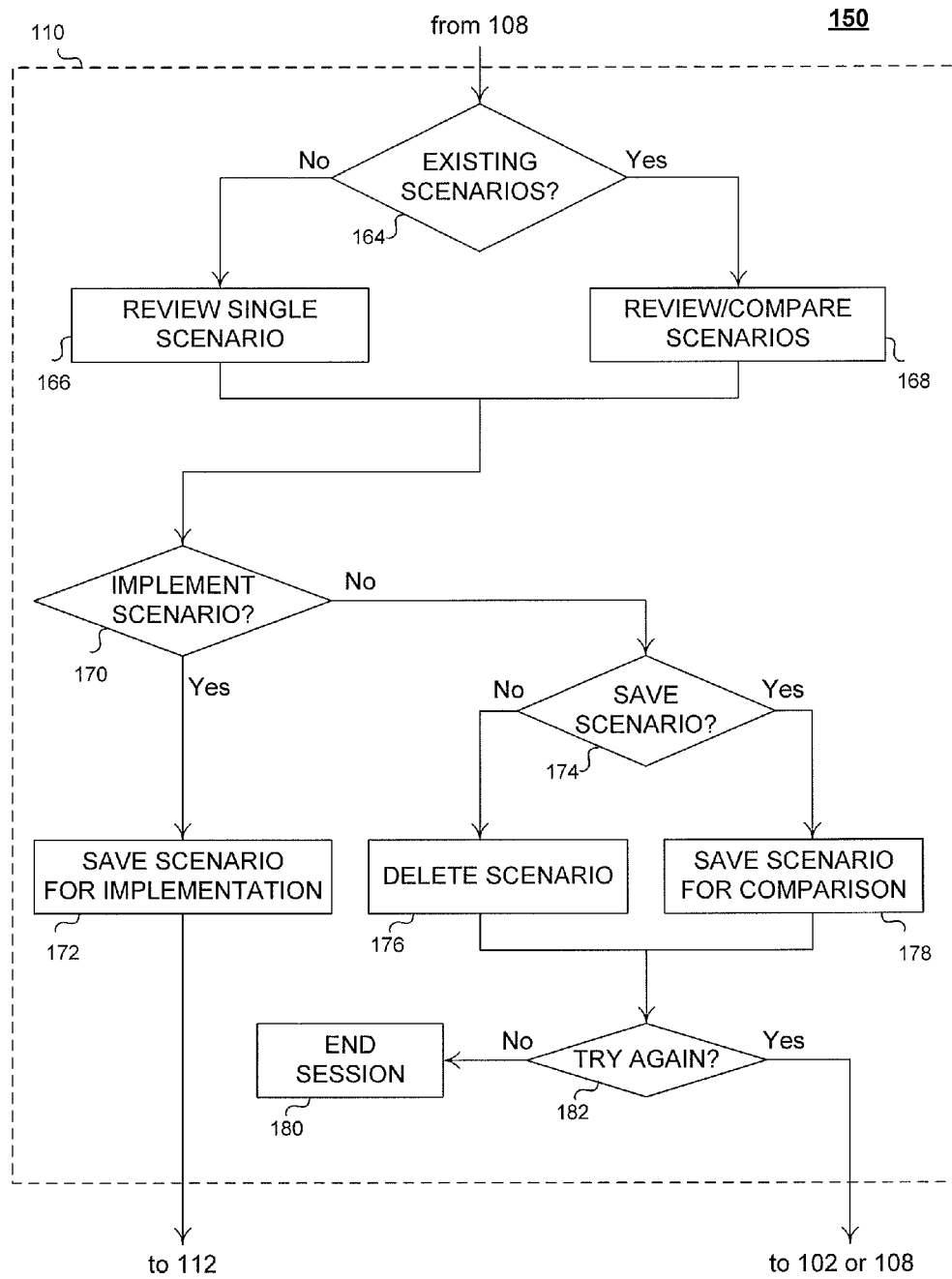
FIG. 4 shows an exemplary flowchart depicting general process flows for reviewing one or more workflow scenarios.

FIG. 4 shows an exemplary flowchart 150 depicting general process flows for reviewing the scenario(s) (step 110) generated from the multi-level optimization process (from step 108). This allows a user to make appropriate business decisions. Reviewing scenario(s) can include determining whether there are any existing scenarios (e.g., either a baseline scenario or previously simulated scenarios) (step 164), reviewing a single scenario if there are no existing scenarios (step 166) or reviewing/comparing two or more scenarios if there are previously saved scenarios (step 168). Advantageously, comparing scenarios generated at two different points in time allows a manager to determine what is different between the scenarios and/or to help formulate feedback in possibly trying a new simulation with different optimization parameters and resource allocations.

The user can select at least one scenario for executing the workflow(s) (step 170), in which case the scenario is saved for implementation (step 172) and an action plan can be subsequently generated (step 112). If a user chooses not to implement a scenario, then the user determines (step 174) whether to delete the scenario (step 176) or save the scenario for comparison and/or implementation at a later time (step 178). The user can determine whether to end the current session (step 180) or to reiterate the optimization process (step 182) by trying to generate additional scenario simulations with existing parameters (step 108) or modify the input parameters to generate different scenarios (step 102). For example, a user can change any one of the constraints for the workflows and/or resource availability (step 102). In response, the management system 250 can automatically re-run the scheduling process (steps 104-110) to determine one or more new scenarios for the workflow(s) that satisfy the changed constraints. In general, the management system 250 provides a dynamic planning process to a user, allowing the user to adjust, based on the optimization results, the number of workflows to receive resource allocation or the resources available for allocation at any point of planning.

In some embodiments, if the optimization scheme uses a probability-of-completion threshold as an optimization constraint, a scenario generated from the optimization scheme (from step 108) is adapted to have a probability of completion same or higher than the threshold. This can indicate to the user that the resulting scenario has a high level of confidence of achieving targeted business goals. In contrast, if no scenario results from the optimization scheme, this may mean that none of the scenarios for scheduling the workflow(s) have probabilities of execution equal or higher then the specified threshold. In this case, the user can choose to run the simulation again (step 182) with at least one different input parameter.

In some embodiments, a user chooses to run the simulation again (step 182) to model various "what-if" scenarios before deciding on a desired scenario of workflow execution. The user can therefore estimate effects of changes in parameters (i.e., changes in workflow volume, resource capacity or business goals) on workflow execution without actually implementing the workflow(s).

Generating an action plan based on a selected scenario (step 112) can include generating instructions to resource managers and/or workflow managers to affect an actual change of resource allocation(s) and/or scheduling. An action plan can also include a set of data highlighting changes necessary to move from the current state of resource allocation and scheduling to a desired state. For example, an action plan can include acquisition of addition resources to meet an anticipated need, such as hiring more human personnel and/or purchasing more physical resource. An action plan can also provide provisions for training existing human personnel or upgrading existing physical resources. In some embodiments, an action plan requires redefining business goals associate with certain workflows to make the goals more feasible.

Figure 5:
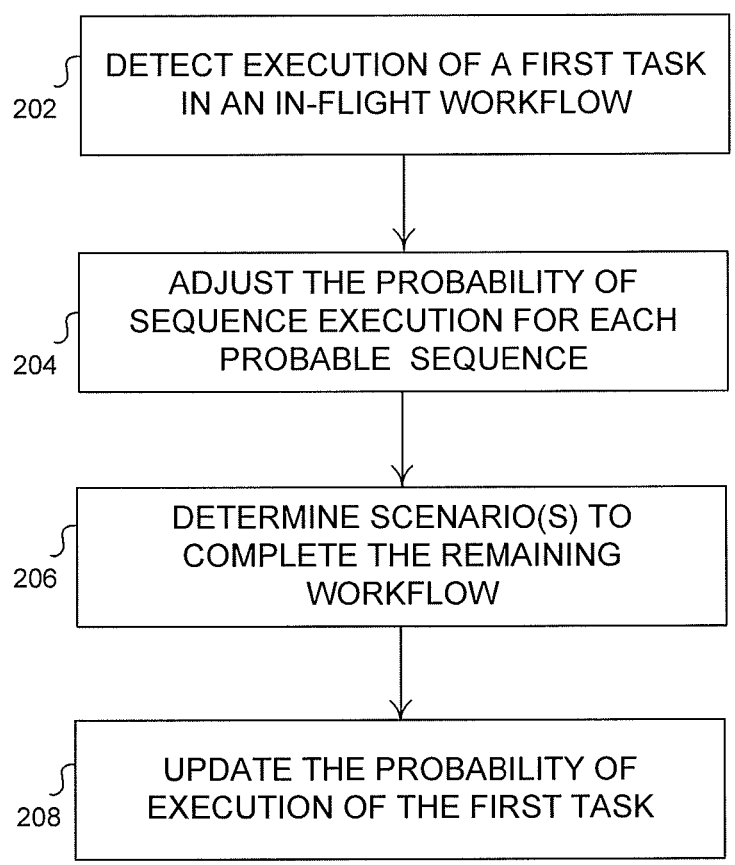
FIG. 5 shows an exemplary flowchart depicting a general process for scheduling at least one in-flight workflow.

FIG. 5 shows an exemplary flowchart 200 depicting a general process for scheduling at least one in-flight workflow. The elements of the flowchart 200 are described using the exemplary management system 250 of FIG. 6. The process includes detecting the execution of a task in a workflow (step 202), adjusting the probability of sequence execution computed for each probable sequence of the workflow in response to the execution of the task (step 204), determining at least one scenario based on the adjusted probable sequences to complete the remaining workflow (step 206) and updating the probability of execution for the executed task (step 208).

The management system 250 monitors an in-flight workflow and detects the execution of a task corresponding to the workflow (step 202). The in-flight workflow can be executed according to a scenario generated from the scheduling process in FIG. 1. In response to the execution of the task, the management system 250 proceeds to adjust the probability of sequence execution associated with each probable sequence previously determined for implementing the workflow (step 204). These probable sequences, along with their initial probabilities of sequence execution (i.e., computed prior to the execution of the task), can be determined from the process of FIG. 1 (at step 104). Adjusting these initial probabilities based on actual task execution data refines the probabilities of sequences execution for implementing the remaining workflow. Using the workflow of FIG. 2 as an example, after the execution of task T1, there is a 75% probability that task T2 is executed and a 25% probability that task T3 is executed. If, however, task T2 is executed, then the management system 250 can recalculate the probabilities to reflect the fact that the probability of execution of task T3 becomes 0%, which narrows the pool of probable sequences for executing the remaining workflow.

Based on the adjusted probable sequences, the management system 250 determines at least one scenario for scheduling the remaining portion of the in-flight workflow by using, for example, the multi-level optimization scheme described above (step 108). Scheduling the in-flight workflow according to the scenario allows workflow constraints to be satisfied without exceeding available resources that remains after the execution of the task. The constraints can be substantially similar to the constraints used for the process 100 (at step 108).

In some embodiments, data associated with the actual execution of a task is used to update statistical information about the probable duration, probable resource demand, and probability of execution of the task. As described above, statistical data about a task can be stored in a database and used to as a part of a sequence for executing another workflow. Updating statistical data with real-life data is adapted to enhance the accuracy of the statistics. This feedback mechanism also refines the stochastic and optimization models used to determine optimal scenarios for executing workflows.

In some embodiments, the process 200 is implemented each time after a task of an in-flight workflow is executed. This dynamic process allows a user to monitor the progress of a workflow during execution and determine, for example, whether the workflow is on track to achieve its business goals. It also gives the user an opportunity to adjust resources and/or constraints in flight. Alternatively, the process 200 can be executed at a desired time by an operator of the management system 250.

Figure 6:
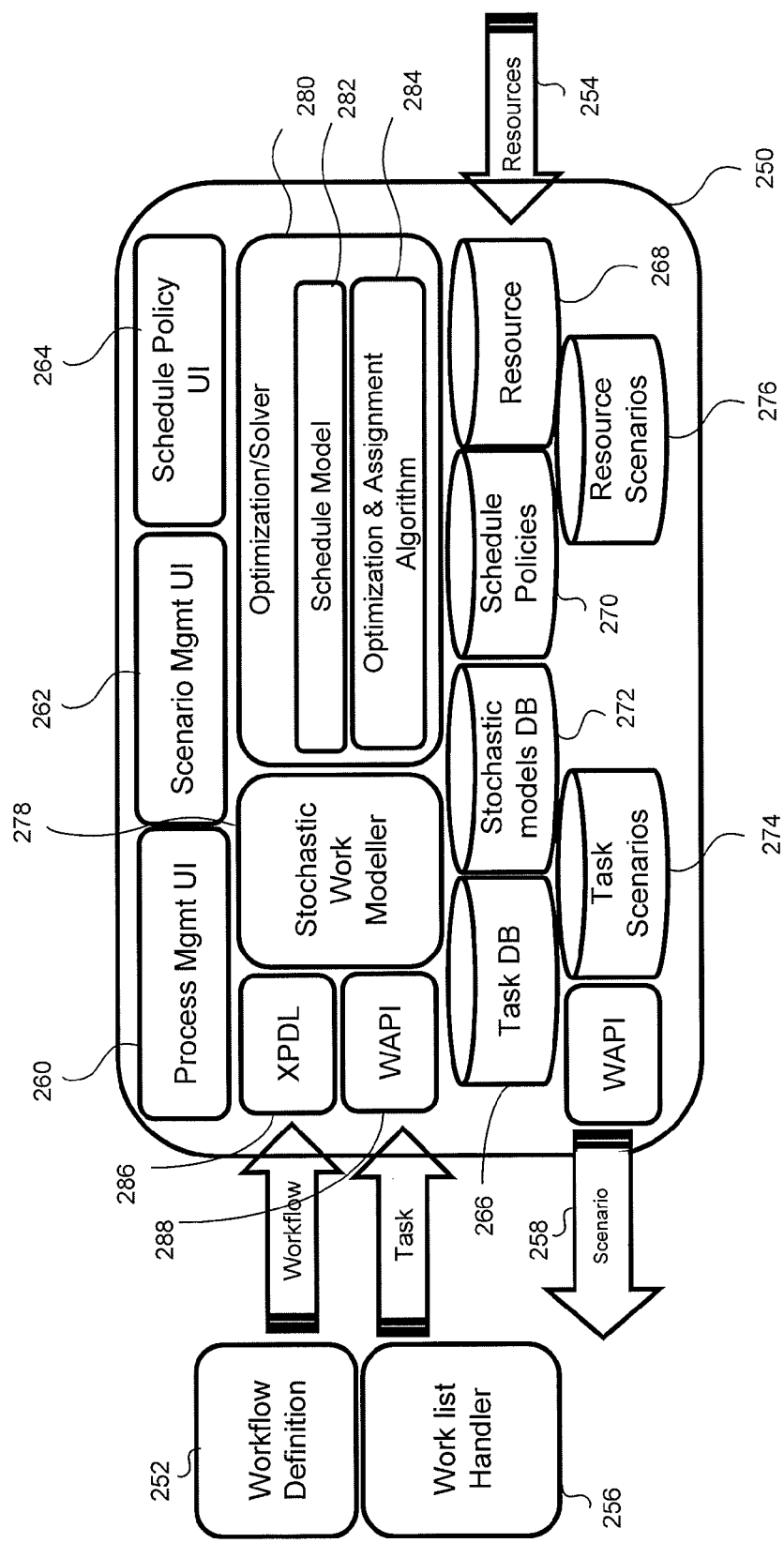
FIG. 6 shows an exemplary block diagram of a management system.

FIG. 6 is a block diagram showing an exemplary design of a management system 250 according to some embodiments. The management system 250 includes a combination of processes and software modules to implement the functions described in flowcharts 100, 150 and 200 of FIGS. 1, 4 and 5, respectively. The management system 250 receives as inputs: i) definition of one or more workflows via input 252, which can include workflow constraints, ii) resource information via input 254, which describes resources available for allocation to the workflows, and iii) a worklist handler 256, which provides data about various executed tasks to the management system 250 and are usable by the management system 250 to construct probable sequences for executing future or in-flight workflows. The management system 250 can also include one or more outputs 258 for providing to a user at least one scenario to schedule the workflows, along with information about the scenario, such as an estimated probability of completion associated with the scheduled scenario.

In some embodiments, the management system 250 includes functionalities for converting inputs of various formats to at least one unified format supported by the management system 250. For example, the XPDL module 286 standardizes input business process definitions to the XML Process Definition Language (XPDL), which can be extended to represent or exchange stochastic data and/or workflows. The WAPI module 288 converts inputs to be compatible with the workflow management application programming interface (WAPI), which can be used to represent tasks, including both to-be scheduled tasks and scheduled tasks.

The management system 250 can provide various interfaces to allow a user and/or an administrator to define parameters for operating the management system 250. As shown, the management system 250 includes a process management graphical user interface (GUI) module 260, a scenario management GUI module 262 and a schedule policy GUI module 264. The process management GUI module 260 can handle user access (e.g., login and/or logout), user administration (e.g., any of the administration functions associated with the support and/or management of the system 250), widget management (e.g., providing the end user with the capability to arrange and save preferences for display of data within the browser area), and/or other GUI services. The schedule policy GUI module 264 allows a user to specify scheduling policies for business units, workflows and/or tasks, which can represent scheduling constraints and/or goals. The scenario management GUI module 260 allows a user to manage a scheduled workflow scenario 258 produced by the management system 250, such as specifying implementation details for a workflow scenario using the process 150 of FIG. 4 or monitoring an in-flight scenario using the process 200 of FIG. 5.

The stochastic work modeler 278 can determine probable sequences (step 104) for executing the workflow(s) defined via input 252. Methods for determining probable sequences for executing a single workflow are described above with reference to FIG. 2 and methods for determining probable sequences for executing multiple workflows are described above with reference to FIGS. 3A and 3B. The stochastic work modeler 278 can use information stored in at least one of the task database 266, the stochastic models database 272, the schedule policies database 270, or the resource database 268 to make such determinations.

The optimization solver 280 can apply an optimization formulation to determine, based the probable sequences generated by the stochastic work modeler 278, one or more scenarios for scheduling the workflows (step 108 of process 100). The scenarios can satisfy the workflow constraints (from input 252) without requiring more resources than those available (from input 254). Each scenario can be associated with an optimized probability of completion. The optimization algorithms and scheduling models used to perform the optimization can be stored in the schedule model database 282 and/or the optimization & assignment algorithm database 284.

Information received by the management system 250, such as via the various inputs and GUI modules, is stored across multiple databases. These databases can also store data produced by the optimization solver 280, the stochastic work modeler 278, the XPDL module 286 and/or the WAPI module 288. For example, the task database 266 can store data related to tasks received from the input 256. Such data includes, for example, when a task has been executed, the duration of the task, the resource requirement of the task, the workflow to which the task belonged, etc. The resource database 268 is configured to store resource information received from the input 254. In general, resource information indicates the resources that are available for allocation to workflows, but can include certain allocation restrictions, such as the time period during which the resource is available. The schedule policies database 270 can store policies for scheduling workflows received from the schedule policy GUI module 264. The stochastic models database 272 can store stochastic parameters for one or more workflows, such as probabilities of completion for the workflows. In addition, the stochastic models database 272 can maintain probable durations and probable resource demands for various tasks. These probable values can be updated based on actual execution data of the tasks stored in the task database module 266. The task scenarios database 274 can store optimized sequences of tasks (e.g., optimized workflows) that can be viewed or re-optimized by the scenario management module 262. Resource scenarios database 276 can store "what-if" resource scenarios that can be viewed or re-optimized by the scenario management module 262. These "what-if" resource scenarios represent optimized workflow scenarios after certain adjustments are made to the resource availability data stored in the resource database 268.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method for optimizing scheduling and resource allocation for a workflow, the method comprising:
   receiving, at a computing device, i) resource constraints representing a plurality of resources available for allocation to the workflow and ii) workflow constraints comprising at least a deadline for completing the workflow and a confidence threshold;
   determining, by the computing device, one or more probable sequences for executing the workflow, each probable sequence comprising a plurality of tasks usable to execute at least a portion of the workflow, wherein each task has a probability of task execution, a probable duration, and a probable resource demand;
   calculating, by the computing device, for each of the one or more probable sequences: i) a probability of sequence execution by the deadline based on the probabilities of task execution of the tasks forming the probable sequence, ii) an estimated resource demand based on the probable resource demands of the tasks forming the probable sequence, and iii) an estimated duration based on the probable durations of the tasks forming the probable sequence; and
   applying, by the computing device, an optimization formulation to determine an optimized scenario for scheduling the workflow by choosing one probable sequence from the one or more probable sequences, wherein applying the optimization formulation comprises:
      optimizing an objective function while satisfying the workflow constraints and the resource constraints, and
      choosing the optimized scenario having i) an estimated resource demand not exceeding the resources available for allocation; ii) an estimated duration meeting the deadline for completing the workflow and iii) a probability of sequence execution greater than or equal to the confidence threshold.

2. The computer-implemented method of claim 1, wherein the probability of task execution of a task defines the probability the task is executed after a previous inter-dependent task is executed in the workflow.

3. The computer-implemented method of claim 1, wherein the workflow constraints comprise at least one of a starting date and an ending date, a duration limit, or a probability-of-completion threshold.

4. The computer-implemented method of claim 1, further comprising:
   monitoring, by the computing device, execution of a first task in the workflow;
   adjusting, by the computing device, the probability of sequence execution corresponding to each of the probable sequences in response to the execution of the first task;
   determining, by the computing device, a second optimized scenario for scheduling the remaining workflow based on the adjusted probable sequences, wherein scheduling the remaining workflow according to the second optimized scenario generates a second optimized probability of completion and satisfies the workflow constraints without exceeding remaining resources available for allocation.

5. The computer-implemented method of claim 4, wherein the remaining resources available for allocation comprises resources remaining after satisfying an actual resource demand of the first task.

6. The computer-implemented method of claim 5, further comprising updating estimated resource demand of the first task based on the actual resource demand of the first task.

7. The computer-implemented method of claim 4, further comprising updating the probability of task execution of the first task based on the execution of the first task.

8. The computer-implemented method of claim 4, wherein the first task is usable as a potential task for executing at least a portion of a second workflow.

9. The computer-implemented method of claim 1, further comprising determining a level of confidence of the workflow to satisfy at least one business goal based on the optimized probability of completion.

10. The computer-implemented method of claim 1, further comprising using linear programming to implement an optimization formulation to determine the optimized scenario.

11. The computer-implemented method of claim 1, further comprising:

receiving, by the computing device, a user input to change at least one of the resource constraints or the workflow constraints; and determining, by the computing device, another optimized scenario based on the one or more probable sequences to satisfy the user input.

12. The computer-implemented method of claim 1, further comprising optimizing scheduling and resource allocation for the workflow and a second workflow, wherein the plurality of resources are available for allocation to both the workflow and the second workflow.

13. A computer-implemented method for optimizing scheduling and resource allocation for at least a first workflow and a second workflow, the method comprising:

receiving, at a computing device, i) resource constraints representing a plurality of resources available for allocation to the first and second workflows and ii) workflow constraints for the first and second workflows comprising deadlines for completing the first and second workflows and confidence thresholds for the first and second workflows;

determining, by the computing device, one or more probable sequences for executing the first and second workflows, each probable sequence comprising a plurality of tasks usable to execute at least a portion of the first workflow, the second workflow, or both, wherein each task has a probability of task execution, a probable duration, and a probable resource demand;

calculating, by the computing device, for each of the one or more probable sequences: i) a probability of sequence execution by the deadline based on the probabilities of task execution of the tasks forming each probable sequence, ii) an estimated resource demand based on the probable resource demands of the tasks forming the probable sequence, and iii) an estimated duration based on the probable durations of the tasks forming the probable sequence; and applying, by the computing device, an optimization formulation to determine an optimized scenario for scheduling the first and second workflows by choosing one probable sequence from the one or more probable sequences, wherein applying the optimization formulation comprises:

optimizing an objective function while satisfying the workflow constraints and the resource constraints for the first and second workflows, and choosing the optimized scenario having i) an estimated resource demand not exceeding the resources available for allocation to the first and second workflows; ii) an estimated duration meeting the deadlines for completing the first and second workflows and iii) a probability of sequence execution greater than or equal to the confidence thresholds for the first and second workflows.

14. The computer-implemented method of claim 13, wherein the scenario schedules the first and second workflows such that they overlap for at least a portion of their durations.

15. A computer-implemented system for optimizing scheduling and resource allocation for at least one workflow, the computer-implemented system comprising:

at least one interface for receiving one or more inputs including i) resource constraints representing a plurality of resources available for allocation to the workflow and ii) workflow constraints comprising at least a deadline for completing the workflow and a confidence threshold;

a processor configured to execute:

a process management module for determining one or more probable sequences for executing the workflow, each probable sequence comprising a plurality of tasks usable to execute at least a portion of the workflow, wherein each task has a probability of task execution, a probable duration, and a probable resource demand;

a stochastic module for calculating for each of the one or more probable sequences: i) a probability of sequence execution by the deadline based on the probabilities of task execution of the tasks forming the probable sequence, ii) an estimated resource demand based on the probable resource demands of the tasks forming the probable sequence, and iii) an estimated duration based on the probable durations of the tasks forming the probable sequence; and an optimization module for applying an optimization formulation to determine an optimized scenario for scheduling the workflow by choosing one probable sequence from the one or more probable sequences wherein applying the optimization formulation comprises:

optimizing an objective function while satisfying the workflow constraints and the resource constraints, and choosing the optimized scenario having i) an estimated resource demand not exceeding the resources available for allocation; ii) an estimated duration meeting the deadline for completing the workflow and iii) a probability of sequence execution greater than or equal to the confidence threshold; and a memory operatively coupled to the processor, the memory comprising a database for storing the plurality of tasks.

16. The computer-implemented system of claim 15, further comprising an output interface for providing the optimized scenario and the optimized probability of completion to a user.

17. The computer-implemented system of claim 15, wherein the one or more inputs include a command from a user to change at least one of the resource information or the workflow constraints.

* * * * *

UNITED STATES PATENT AND TRADEMARK OFFICE
CERTIFICATE OF CORRECTION

PATENT NO. : 8,583,467 B1
APPLICATION NO. : 13/592869
DATED : November 12, 2013
INVENTOR(S) : Morris et al.

Page 1 of 1

It is certified that error appears in the above-identified patent and that said Letters Patent is hereby corrected as shown below:

In the Claims

In claim 15, column 18, line 33, "probable sequence" should read --probable sequence,--.

Signed and Sealed this
Sixth Day of May, 2014

Michelle K. Lee
*Deputy Director of the United States Patent and Trademark Office*